(12) United States Patent
Burkett

(10) Patent No.: US 7,906,726 B1
(45) Date of Patent: Mar. 15, 2011

(54) LOCKING CONDUIT LID

(76) Inventor: Karl A. Burkett, Austin, TX (US)

( * ) Notice: Subject to any disclaimer, the term of this patent is extended or adjusted under 35 U.S.C. 154(b) by 822 days.

(21) Appl. No.: 11/833,635

(22) Filed: Aug. 3, 2007

(51) Int. Cl.
*H02G 3/04* (2006.01)

(52) U.S. Cl. .............. 174/68.1; 174/72 A; 174/73.1; 70/57.1; 70/58

(58) Field of Classification Search .......... 174/68.1, 174/68.3, 481, 72 A, 73.1; 70/58, 57.1, 57; 439/105; 138/89, 108, 90; 403/901, 300; 285/901
See application file for complete search history.

(56) References Cited

U.S. PATENT DOCUMENTS

| | | | | |
|---|---|---|---|---|
| 5,067,843 A | * | 11/1991 | Nova | 403/301 |
| 5,406,032 A | * | 4/1995 | Clayton et al. | 174/659 |
| 5,763,832 A | * | 6/1998 | Anselm | 174/669 |
| 6,140,582 A | * | 10/2000 | Sheehan | 174/669 |
| 7,390,979 B1 | * | 6/2008 | Johnson | 174/655 |
| 2007/0020974 A1 | * | 1/2007 | Carlson | 439/105 |

* cited by examiner

*Primary Examiner* — Angel R Estrada
(74) *Attorney, Agent, or Firm* — Law Office of J.D. Pemberton; John Pemberton

(57) ABSTRACT

A locking conduit lid and method of use that can lock or secure wires inside a conduit such that is would be almost impossible for a would be thief to pull the wires out of the conduit. The locking conduit lid contains a conduit sleeve that is designed to be fixedly attached to the inside of a polyvinyl-chloride (PVC) pipe, rigid metal pipe, or any other existing pipe or conduit that contains electrical wires. The electrical wires are secured to the conduit sleeve such that they cannot be pulled out of the conduit sleeve. A locking conduit lid prevents access to the wires inside the conduit sleeve thereby preventing theft of the wires.

17 Claims, 3 Drawing Sheets

LOCKING CONDUIT LID

BACKGROUND OF THE INVENTION

1. Technical Field

This invention relates to electrical conduits, and more particularly, to a lock for an electrical conduit.

2. Description of Related Art

Most if not all of the municipalities in the continental United States have conduits than contain electrical wires. The electrical wires supply power to streetlights, recreational areas, and other areas or devices that require electricity. The conduits can run for miles underground and have above ground access points at places like light poles and ground boxes.

Unfortunately, thieves have discovered that the above ground access points have very little protection and that it is relatively easy to use the above ground access points to steal the electrical wire contained in the conduit. Typically, to gain access to the conduit, thieves first break the ground box lid found on most above ground access points. This allows the thief to gain access to and steal thousands of feet of wire contained within the conduit. Once removed, the wire can be sold as scrap copper to metal recyclers.

What is needed is a device or method that will lock or secure existing wires inside an existing conduit and pinch the wires in such a way that is would be impossible or nearly impossible for a would be thief to pull the wires out of the conduit.

SUMMARY OF INVENTION

The present invention solves the above-described problem by providing a locking conduit lid and method of use that can lock or secure existing wires inside a conduit. The wires are secured in such a way that it would be almost impossible for a would be thief to pull the wires out of the conduit. The locking conduit lid contains a conduit sleeve that securely holds the wires extending from the conduit and prevents them from being pulled from the conduit. The conduit sleeve is designed to slip inside an existing polyvinylchloride (PVC) pipe, rigid metal pipe, or any other pipe or conduit that contains electrical wires. In addition, the conduit sleeve is equipped with a means for securing the conduit sleeve to the existing conduit to prevent the locking conduit lid from being pulled out of the conduit.

The locking conduit lid contains a conduit sleeve, locking lid, and locking nut. The conduit sleeve can fit inside an existing conduit and is made of a relatively hard material such as ceramic or metal wherein the material is relatively difficult to saw, cut, drill through, or otherwise compromise the structure such that access can be gained to the interior of the conduit sleeve and the wires within the conduit.

The conduit sleeve comprises a first sleeve and a second sleeve wherein the first sleeve and second sleeve can be mated or secured together. Once mated together, they form a conduit sleeve such that the existing wires from the conduit are at least partially contained within the conduit sleeve. In one embodiment, when the conduit sleeve is going to be installed in a new conduit instead of an existing conduit, the conduit sleeve may be a single unit instead of a first and second sleeve that are mated together.

The conduit sleeve contains a securing means that secures the conduit sleeve in the conduit and helps prevent the locking conduit lid from being pulled out of the conduit by would be thieves. The conduit sleeve securing means may be tines or spring loaded sharp tines that extent up and away from the conduit sleeve, glue or adhesive that is strong enough to secure the conduit sleeve to the conduit, threads such that the conduit sleeve may be threaded into/onto or screwed into/onto the conduit, or other means to secure the conduit sleeve into the conduit and prevent the locking conduit lid from being pulled out of the conduit by would be thieves.

The conduit sleeve contains a means for securing the wires from the conduit inside the conduit sleeve such that the wires cannot be pulled or it is relatively difficult to pull the wires out of the conduit. The means for securing the wires include, but is not limited to tying the wires in a knot, screwing the wires securely to the conduit sleeve or the locking conduit lid, clamping the wires to the conduit sleeve or locking conduit lid, inserting the wires in a recess and securing the wires into the recess with a wire bar, or almost any other means that pinches, restricts or secures the wires to the conduit sleeve and prevents them from being pulled out of the conduit yet still allows electricity to flow through the wires. In addition to the conduit sleeve, the locking conduit lid also contains a locking lid, and a lock nut. The locking lid and lock nut prevent would be thieves from tampering with the conduit sleeve and locking conduit lid.

To use the locking conduit lid, the first step is to locate an existing conduit with wires extending from the conduit. Next, the diameter and length of the conduit and conduit access point is determined and the desired diameter and length of the conduit sleeve is calculated based on the diameter and length of the conduit and conduit access point. For example, if the conduit access point has about three feet of exposed conduit, then the length of the conduit sleeve would be at least about three feet. Once the proper diameter and length has been determined, a properly sized first sleeve and second sleeve are joined together to form the conduit sleeve such that the existing wires from the conduit are contained in the middle portion of the conduit sleeve. If the locking conduit lid is being installed on a new conduit, the conduit sleeve may not require the mating of the first and second sleeve.

After the conduit sleeve is inserted into the existing conduit and secured in place, the wires from the conduit are secured to the conduit sleeve such that it would be relatively difficult for a would be thief to pull the wires from the conduit sleeve. Once the wires are secured to the conduit sleeve, the locking lid is placed on the conduit sleeve and secured to the conduit sleeve with the lock nut.

Because the locking conduit lid is secured relatively deep into the conduit and the wires from the conduit are secured to the locking conduit lid, the wires cannot be pulled or otherwise extracted from or it is relatively difficult to pull or otherwise extract the wires from the conduit, thus preventing wire theft. In addition, the locking conduit lid helps prevent wire theft by preventing or deterring attempts to cut, saw, puncture, or otherwise destroy the conduit because the rigid locking conduit lid extends relatively deep into the conduit and thus deters destruction of the conduit. In addition if the conduit is used to supply electricity to a pole, the locking conduit lid prevents the wire from being pulled out of the conduit if an accident forces the pole away from the conduit. Also, the locking conduit lid provides sealing and containment of the wires extending from the conduit, and provides a limited prevention seal from rodents who might chew or otherwise destroy the wire in the conduit.

BRIEF DESCRIPTION OF THE DRAWINGS

FIG. 3 is an isometric view of the conduit sleeve in accordance with an embodiment of the present invention.

DETAILED DESCRIPTION OF THE INVENTION

Figure 1:
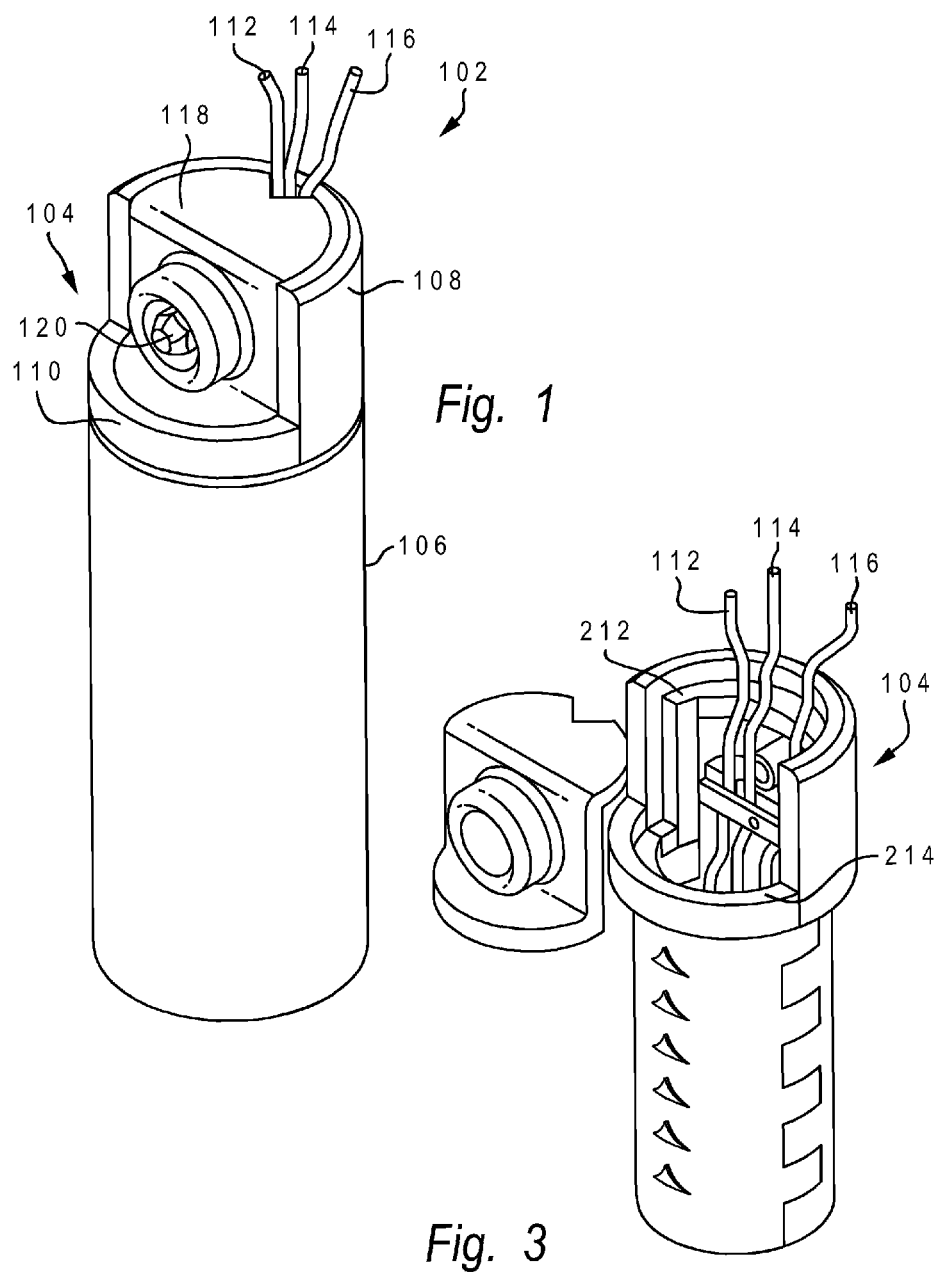
FIG. 1 is an isometric view of a rigid member of a locking conduit lid in use in accordance with an embodiment of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings are indicated with like reference numerals and similar features as shown in alternate embodiments in the drawings are indicated with similar reference numerals.

Referring to FIG. 1, shown is locking conduit lid 102. Locking conduit lid 102 contains conduit sleeve 104, first wire 112, second wire 114, ground wire 116, locking lid 118, and locking nut 120. Conduit sleeve 104 can fit inside conduit 106. Conduit 106 may be a newly installed conduit or an existing conduit and is a typical conduit as is known in the art. Conduit sleeve 104 is made of a relatively hard material such as ceramic or metal wherein the metal is relatively difficult to saw or drill through, cut, or otherwise compromise the structure such that access can be gained to the interior of conduit sleeve 104.

The length of conduit sleeve 104 depends on the length of conduit 106 that is exposed and is accessible to a would be thief. Conduit sleeve 104 extends a sufficient length inside the exposed portion of conduit 106 such that sawing, drilling, cutting, or otherwise compromising the structure of existing conduit sleeve 104 is relatively difficult and after conduit sleeve 104 has been inserted into conduit 106, the exposed or vulnerable portion of conduit 106 is protected by conduit sleeve 104. In one embodiment, the length of conduit sleeve 104 is such that conduit sleeve 104 can be inserted at least about 4 inches into conduit 106. Conduit sleeve 104 contains first sleeve 108, and second sleeve 110. First sleeve 108 and second sleeve 110 can be mated or secured together to form conduit sleeve 104 and are shown in more detail in FIG. 2.

Figure 2:
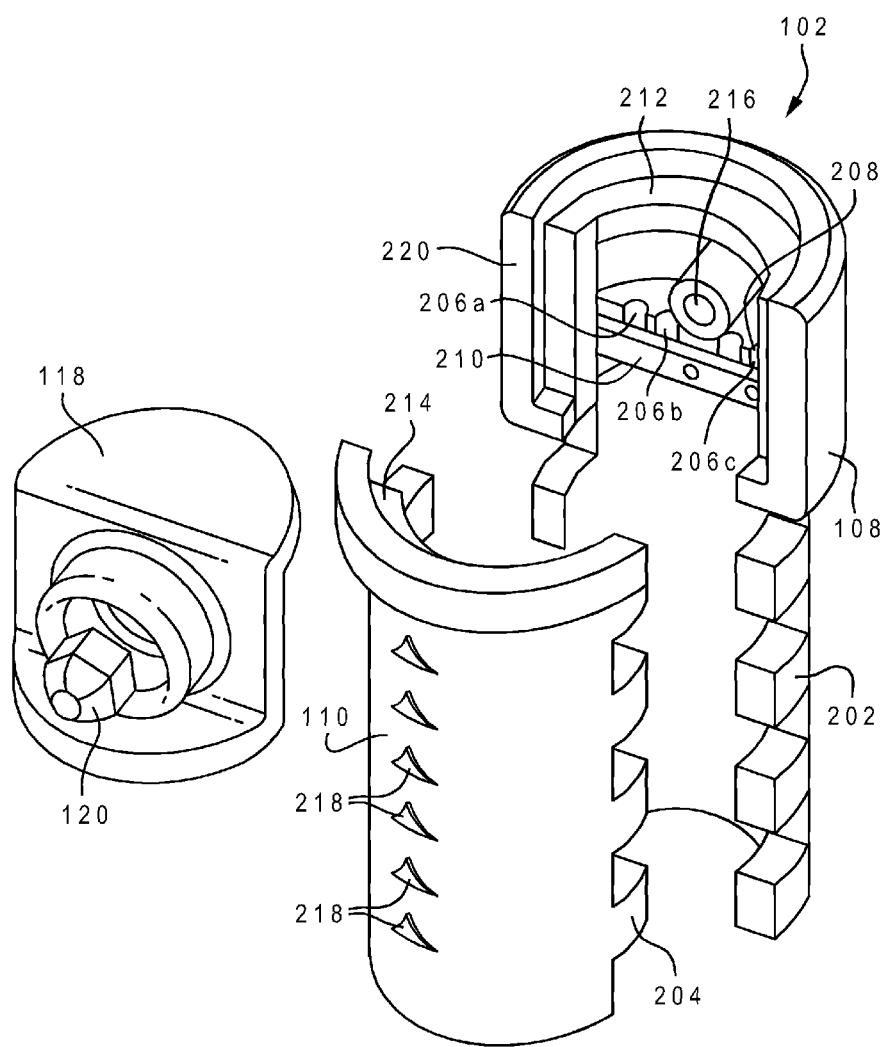
FIG. 2 is an exploded diametric view of a conduit sleeve in accordance with an embodiment of the present invention.

FIG. 2 is an exploded view of conduit sleeve 104. Conduit sleeve 104 contains first sleeve 108, first mating member 202, second sleeve 110, second mating member 204, first wire recess 206a, second wire recess 206b, ground wire recess 206c, secure mounting 208 for ground wire 116, wire bar 210, upper secure rest 212 for locking lid 118, lower secure rest 214 for locking lid 118, attachment means 216 for locking nut 120, and conduit sleeve securing means 218.

Prior to conduit sleeve 104 being inserted into conduit 106, first sleeve 108 and second sleeve 110 can be mated or joined together and then taken apart relatively easily. Once first sleeve 108 and second sleeve 110 are joined together to form conduit sleeve 104 and conduit sleeve 104 is inserted into conduit 106, it is relatively difficult to separate first sleeve 108 and second sleeve 110. During installation, first sleeve 108 and second sleeve 110 are mated together with the existing wire in the middle of the mated pair and once mated together, first sleeve 108 and second sleeve 110 form a hollow cylinder such that the existing wire contained in conduit 106 can pass through the center of the of conduit sleeve 104. The existing wire is show in FIGS. 1 and 3 as first wire 112, second wire 114, and ground wire 116. The existing wire runs through conduit 106 and conduit sleeve 104.

First sleeve 108 contains extension 220. Extension 220 is higher than the top of second sleeve 110 and extension 220 contains first wire recess 206a, second wire recess 206b, ground wire recess 206c, secure mounting 208 for ground wire 116, wire bar 210, upper secure rest 212 for locking lid 118, and attachment means 216 for locking nut 120. First wire recess 206a is able to contain at least a portion of first wire 112. Second wire recess 206b is able to contain at least a portion of second wire 114. Ground wire recess 206c is able to contain at least a portion of ground wire 116. Wire bar 224 extends over each wire recess 206a, 206b, and 206c and secures the respective wire in each recess. This prevents first wire 112, second wire 114, and ground wire 116 from being pulled out of locking conduit lid 102 and if first wire 112, second wire 114, and ground wire 116 are pulled with enough force, they will break off at wire holder 206. It should be obvious to those skilled in the art that other means may be used to prevent first wire 112, second wire 114, and ground wire 116 from being pulled out of locking conduit lid 102. For example, other means for securing first wire 112, second wire 114, and ground wire 116 include, but are not limited to tying the wires in a knot, screwing the wires securely to locking conduit lid 102, clamping the wires, or almost anything other means that pinches, restricts or secures the wires and prevents them from being pulled out of locking conduit lid 102.

Second sleeve 110 contains second mating member 204 and lower secure rest 214. Second mating member 204 mates with first mating member 202 such that a hollow cylinder is formed wherein the hollow cylinder can surround and contain first wire 112, second wire 114, and ground wire 116 from conduit 106. First mating member 202 and second mating member 204 may have a mating profile such as that shown in FIG. 2, or any other profile that would allow first sleeve 108 and second sleeve 110 to form a hollow cylinder wherein the hollow cylinder can surround and contain the existing wire from conduit 106. FIG. 3 shows first sleeve 108 joined to second sleeve 110 forming conduit sleeve 104 and first wire 112, second wire 114, and ground wire 116 secured to conduit sleeve 104. In one embodiment, first sleeve 108 and second sleeve 110 do not have a mating profile but are glued or clamped together. In another embodiment, a slit in conduit sleeve 104 or small slit in sleeve conduit sleeve 104 is used to assist the insertion of the wires and contain the existing wires in conduit 106. The slit may be used when there is an existing conduit in place.

The above described invention is designed to fit inside an existing conduit. If the present invention is to be installed in a new conduit, then there may not be a first sleeve 108 and second sleeve 110 or first sleeve 108 and second sleeve 110 may be pre-joined. Then, if the conduit is new, locking conduit lid 102 is inserted into conduit 106 before first wire 112, second wire 114, and ground wire 116 are ran through conduit 106. After the wires are run through conduit 106, they are secured to locking conduit lid 102 as described above.

After first sleeve 108 and second sleeve 110 are mated together, upper secure rest 212 and lower secure rest 214 support locking lid 118. FIG. 1 shows first sleeve 108 mated to second sleeve 110 and upper secure rest 212 and lower secure rest 214 supporting locking lid 118. After supporting locking lid 118 is supported on upper secure rest 212 and lower secure rest 214, locking nut 120 is inserted through locking lid 118 and into attachment means 216.

Attachment means 216 may be threaded such that locking nut 120 is threaded into attachment means 216 for a secure attachment. Locking nut 120 may be a one way nut such that once locking nut 120 is secured to attachment means 216 it is relatively difficult to remove thus securing locking lid 118 to conduit sleeve 104 and preventing would be thieves from tampering with pinch wire holder 206. In another embodiment, instead of locking nut 120, a locking means is used such that only an authorized user can access and use the locking means. For example, the locking means may include but is not limited to a mechanical lock, electro-mechanical lock, combination lock, or some other type of locking means that would prevent access to the means for securing the wires to locking conduit lid 102.

When locking conduit lid 102 is inserted into conduit 106, conduit sleeve securing means 218 prevents locking conduit lid 102 from being pulled out of conduit 106 by would be thieves. Conduit sleeve securing means 218 may be tines, spring loaded sharp tines that extent up and away from conduit sleeve 104. In another embodiment, conduit sleeve securing means 218 may be glue or adhesive that is strong enough to secure locking conduit lid 102 to conduit 106. In yet another embodiment, securing means 218 may be threads such that locking conduit lid 102 may be threaded into/onto or screwed into/onto conduit 106.

If locking conduit lid 102 is to provide an extension of conduit 106, then locking conduit lid 102 may be threaded or screwed onto the outside of conduit 106. The extension created by locking conduit lid 102 is from a non-vulnerable location into a vulnerable location and would be used to facilitate easier access to the wire inside conduit 106 for maintenance purposed. By using locking conduit lid 102 as an extension, conduit 106 can remain in the relatively safe non-vulnerable location while locking conduit lid 102 extends into the vulnerable location and provides the necessary protection for the wire inside conduit 106. It should be obvious to those skilled in the art that other means exist to secure locking conduit lid 102 in conduit 106 and prevent locking conduit lid 102 from being pulled out of conduit 106 by would be thieves.

Figure 4:
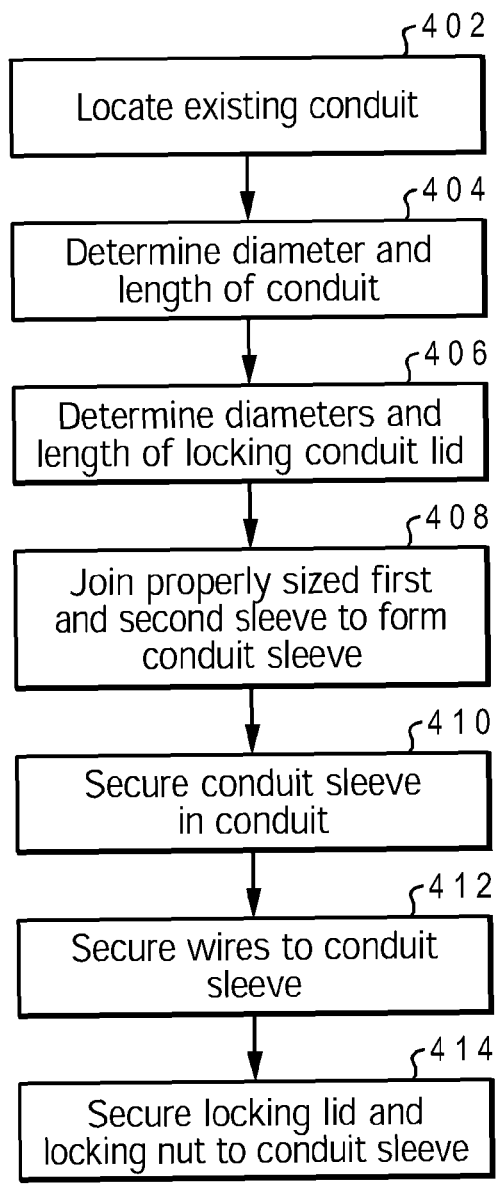
FIG. 4 is a flow diagram depicting the steps used in accordance with an embodiment of the present invention.

To use locking conduit lid 102, the first step, as shown in FIG. 4, is to locate conduit 106, Step 402. Conduit 106 may be an existing conduit or a new conduit. Next, the diameter and exposed length of conduit 106 is determined, Step 404 and the desired diameter and length of locking conduit lid 102 is calculated based on the desired level of protection, Step 406. The desired diameter of locking conduit lid 102 is such that locking conduit lid 102 can be relatively easily secured inside conduit 106. The desired length of locking conduit lid 102 is such that once locking conduit lid 102 is inserted into conduit 106, it is relatively difficult to saw, drill, cut, or otherwise compromising the structure of conduit 106 and/or locking conduit lid 102 and access the wires in conduit 106.

Once the proper diameter and length has been determined, a properly sized first sleeve 108 and second sleeve 110 are joined together to form conduit sleeve 104 such that the existing wires from conduit 106 are contained in the middle portion of conduit sleeve 104, Step 408. Next, conduit sleeve 104 is inserted into conduit 106 and secured in place, Step 410. Then, the wires from conduit 106 are secured to conduit sleeve 104 such that it would be relatively difficult for a would be thief to pull the wires from conduit sleeve 104, Step 412. Once conduit sleeve 104 is secured into conduit 106 and the wires are secured to conduit sleeve 104, locking lid is placed on conduit sleeve 104 and secured to conduit sleeve 104 with locking nut 120, Step 414.

Because locking conduit lid 102 is secured relatively deep into conduit 106 and the wires from conduit 106 are secured to locking conduit lid 102 such that they cannot be pulled from conduit 106, locking conduit lid 102 helps prevent wire theft by preventing or deterring cutting of conduit. In addition if the conduit is used to supply electricity to a pole, the locking conduit lid prevents the wire from being pulled out of the conduit if an accident forces the pole away from the conduit. Also, the locking conduit lid provides sealing and containment of the wires extending from conduit 106, and provides a limited prevention seal from rodents who might chew or otherwise destroy the wire in the conduit.

It should be understood that the foregoing relates to exemplary embodiments of the invention and that modifications may be made without departing from the spirit and scope of the invention as set forth in the following claims.

What is claimed is:

1. A device for locking or securing the wires contained inside a conduit to prevent theft of the wires, the device comprising:
   a conduit sleeve that can fit inside a conduit containing electrical wires, wherein the conduit sleeve contains means for fixedly securing the conduit sleeve to the conduit, and wherein the means for fixedly securing the conduit sleeve to the conduit is spring loaded sharp tines that extent up and away from the conduit sleeve, glue, adhesive, or threads such that locking conduit lid may be threaded into or onto the conduit;
   mounting inside the conduit sleeve that can secure the electrical wires contained in the conduit; and
   a locking lid that fixedly attaches to the conduit sleeve and prevents access to the mounting inside the conduit sleeve.

2. The device for locking or securing the wires contained inside a conduit of claim 1 wherein the conduit sleeve is made of ceramic or metal.

3. The device for locking or securing the wires contained inside a conduit of claim 1 wherein the conduit sleeve is comprised of a first sleeve and a second sleeve and the first and second sleeve can be mated together to form a hollow cylinder.

4. The device for locking or securing the wires contained inside a conduit of claim 1 wherein the conduit sleeve can be inserted at least about 4 inches into the conduit.

5. The device for locking or securing the wires contained inside a conduit of claim 1 wherein the mounting inside the conduit sleeve that can secure the electrical wires contained in the conduit include at least one recess able to contain at least a portion of the electrical wires inside the conduit and at least one bar that extends over the at least one recess wherein the bar secures the wire in the at least one recess and prevents the wire from being pulled out of the at least one recess.

6. The device for locking or securing the wires contained inside a conduit of claim 1 wherein the conduit sleeve contains an upper secure rest and a lower secure rest to support the locking lid and the locking lid is secured to the conduit sleeve with a locking means.

7. The device for locking or securing the wires contained inside a conduit of claim 6 wherein the locking means can only be removed by an authorized user.

8. A method for locking or securing the wires contained inside a conduit to prevent theft of the wires, the method comprising the steps of:
   locating a conduit;
   determining the diameter and exposed length of the conduit;

determining the length and diameter of a conduit sleeve such that the conduit sleeve can be secured inside the conduit wherein the conduit sleeve comprises:
mounting inside the conduit sleeve that can secure the electrical wires contained in the conduit; and
a locking lid that fixedly attaches to the conduit sleeve and prevents access to the mounting inside the conduit sleeve;
securing the conduit sleeve inside the conduit;
securing the wires from the conduit to the conduit sleeve by placing the wires in at least one recess able to contain at least a portion of the wire inside the conduit and attaching at least one bar that extends over the at least one recess wherein the bar secures the wire in the at least one recess and prevents the wire from being pulled out of the at least one recess; and
securing the locking lid to the conduit sleeve.

9. The method of claim 8 wherein the method includes the step of mating a first sleeve to a second sleeve before securing the conduit sleeve inside the conduit.

10. The method of claim 8 wherein the conduit sleeve is inserted at least about 4 inches into the conduit.

11. The method of claim 8 wherein the step of securing the conduit sleeve inside the conduit includes using spring loaded sharp tines that extent up and away from the conduit sleeve, glue, adhesive, or threads such that locking conduit lid may be threaded into or onto the conduit.

12. The method of claim 8 wherein the conduit sleeve contains an upper secure rest and a lower secure rest to support the locking lid and the locking lid is secured to the conduit sleeve with a locking means.

13. The method of claim 8 wherein the conduit sleeve is made of ceramic or metal.

14. A device for locking or securing the wires contained inside a conduit to prevent theft of the wires, the device comprising:
a conduit sleeve can fit into a conduit containing electrical wires wherein the conduit sleeve is fixedly secured to the conduit by spring loaded sharp tines that extent up and away from the conduit sleeve, glue, adhesive, or threads such that locking conduit lid may be threaded into or screwed into the conduit;
mounting inside the conduit sleeve that can secure the electrical wires contained in the conduit to the conduit sleeve wherein the mounting includes at least one recess able to contain at least a portion of the electrical wires inside the conduit and at least one bar that extends over the at least one recess wherein the bar secures the wire in the at least one recess and prevents the wire from being pulled out of the at least one recess; and
a locking lid that fixedly attaches to the conduit sleeve and prevents access to the mounting inside the conduit sleeve.

15. The device for locking or securing the wires contained inside a conduit of claim 14 wherein the conduit sleeve is comprised of a first sleeve and a second sleeve that can be mated together to form a hollow cylinder.

16. The device for locking or securing the wires contained inside a conduit of claim 14 wherein the conduit sleeve is made or ceramic or metal.

17. The device for locking or securing the wires contained inside a conduit of claim 14 wherein the conduit sleeve contains an upper secure rest and a lower secure rest to support the locking lid and the locking lid is secured to the conduit sleeve with a locking means wherein the locking means can only be removed by an authorized user.

* * * * *